United States Patent [19]

Riedl

[11] 4,012,903
[45] Mar. 22, 1977

[54] INTERNAL COMBUSTION ENGINE

[76] Inventor: Frank E. Riedl, 208 N. Terrace Ave., Mount Vernon, N.Y. 10550

[22] Filed: Oct. 2, 1974

[21] Appl. No.: 511,430

Related U.S. Application Data

[63] Continuation-in-part of Ser. No. 274,790, July 24, 1972, abandoned.

[52] U.S. Cl. .................... 60/39.45; 60/39.51 R; 60/263; 60/269; 123/8.23
[51] Int. Cl.² ................................. F02B 53/00
[58] Field of Search ........... 60/39.45, 39.51, 39.55, 60/39.61, 599, 263, 269; 123/8.23, 8.41

[56] References Cited
UNITED STATES PATENTS

| | | | |
|---|---|---|---|
| 922,875 | 5/1909 | Fraser | 60/39.51 R |
| 1,287,268 | 12/1918 | Edwards | 123/8.41 |
| 1,919,355 | 7/1933 | Bancroft | 60/39.61 X |
| 2,631,428 | 3/1953 | Shames | 60/39.61 X |
| 2,895,294 | 7/1959 | Terrell | 60/39.51 X |
| 3,188,800 | 6/1965 | Bohr | 60/39.45 X |
| 3,218,807 | 11/1965 | Berchtold et al. | 60/39.45 X |
| 3,254,489 | 6/1966 | Eickmann | 60/39.61 |
| 3,286,543 | 11/1966 | Porter | 60/39.16 S X |
| 3,667,874 | 6/1972 | Weatherston et al. | 418/206 X |
| 3,724,427 | 4/1973 | Sauder | 123/8.41 |
| 3,782,340 | 1/1974 | Nam | 123/8.23 |

FOREIGN PATENTS OR APPLICATIONS

| | | | |
|---|---|---|---|
| 914,686 | 8/1954 | Germany | 123/8.23 |
| 1,030,104 | 5/1958 | Germany | 60/39.16 S |
| 544,261 | 6/1956 | Italy | 123/8.23 |
| 646,017 | 9/1962 | Italy | 60/39.45 |
| 1,020,274 | 2/1966 | United Kingdom | 123/8.45 |

*Primary Examiner*—Carlton R. Croyle
*Assistant Examiner*—Michael Koczo, Jr.
*Attorney, Agent, or Firm*—Wooster, Davis & Cifelli

[57] ABSTRACT

An internal combustion engine comprises a housing defining an air inlet opening, a first set of rotatably mounted interengaging air intake and compression rotor wheels, and an air passageway connecting said air intake and compression rotor wheels to a second set of rotatably mounted interengaging compression and metering rotor wheels. The compression and metering rotor wheels deliver air to a combustion chamber defined by the housing. Fuel is injected into the combustion chamber and ignited. The combustion chamber communicates with a third set of rotatably mounted interengaging output rotor wheels which are driven by the exhaust gases and are connected to drive the aforementioned rotor wheels. The working area of the output rotor wheels is greater than the working area of the compression and metering rotor wheels, wherein the combustion gases always drive the output rotor wheels. Alternative embodiments of the internal combustion engine include an additional set of compression and metering rotors which deliver air to a jet combustion chamber. Other embodiments of the internal combustion engine include an exhaust manifold connected to the outlet from output drive rotors to direct the exhaust gases around the engine for exhaust. The air passageway connecting the first set of air intake and compression rotor wheels and the second set of compression and metering rotor wheels may be disposed within the exhaust manifold to heat the compressed air, and the combustion chamber and the air passage leading thereto may also be disposed within the exhaust manifold to maintain them at a high temperature. The exhaust manifold may also be disposed across the air inlet opening whereby entering air passes over the exhaust manifold and is preheated. Gear means for driving the compression and metering rotors at at least two different speeds and means for selectively engaging the gear means for driving the compression and metering rotors at a desired one of the speeds are also provided.

13 Claims, 28 Drawing Figures

FIG. I.

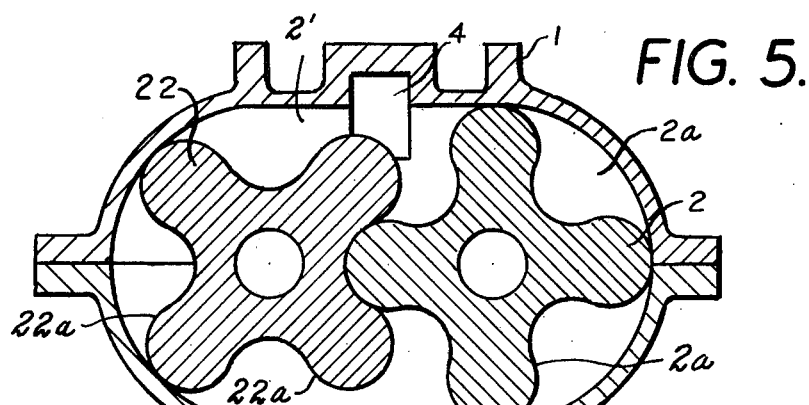
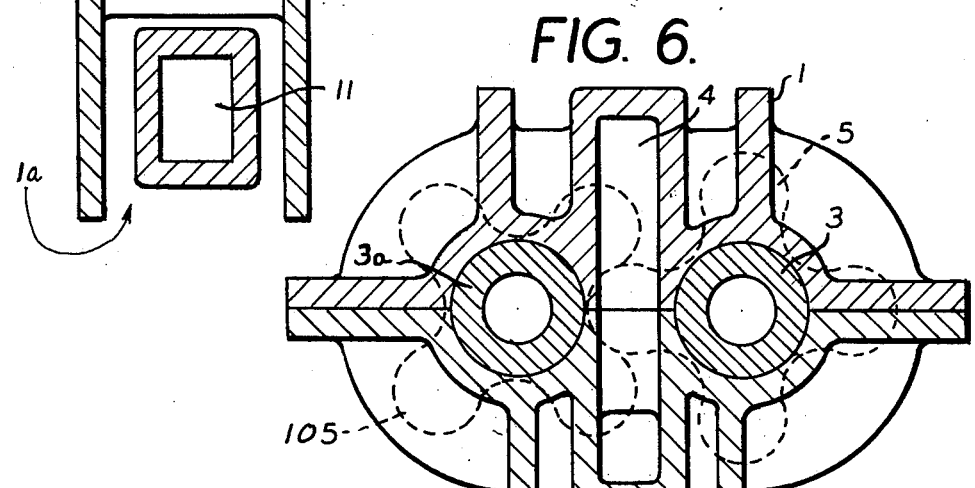
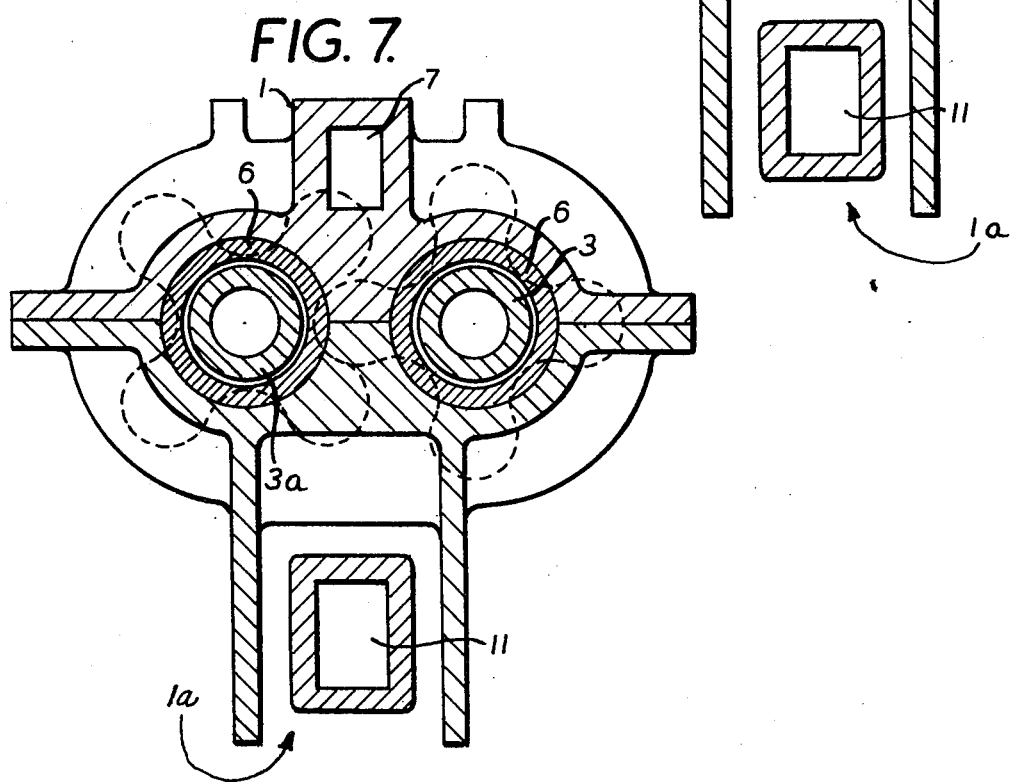

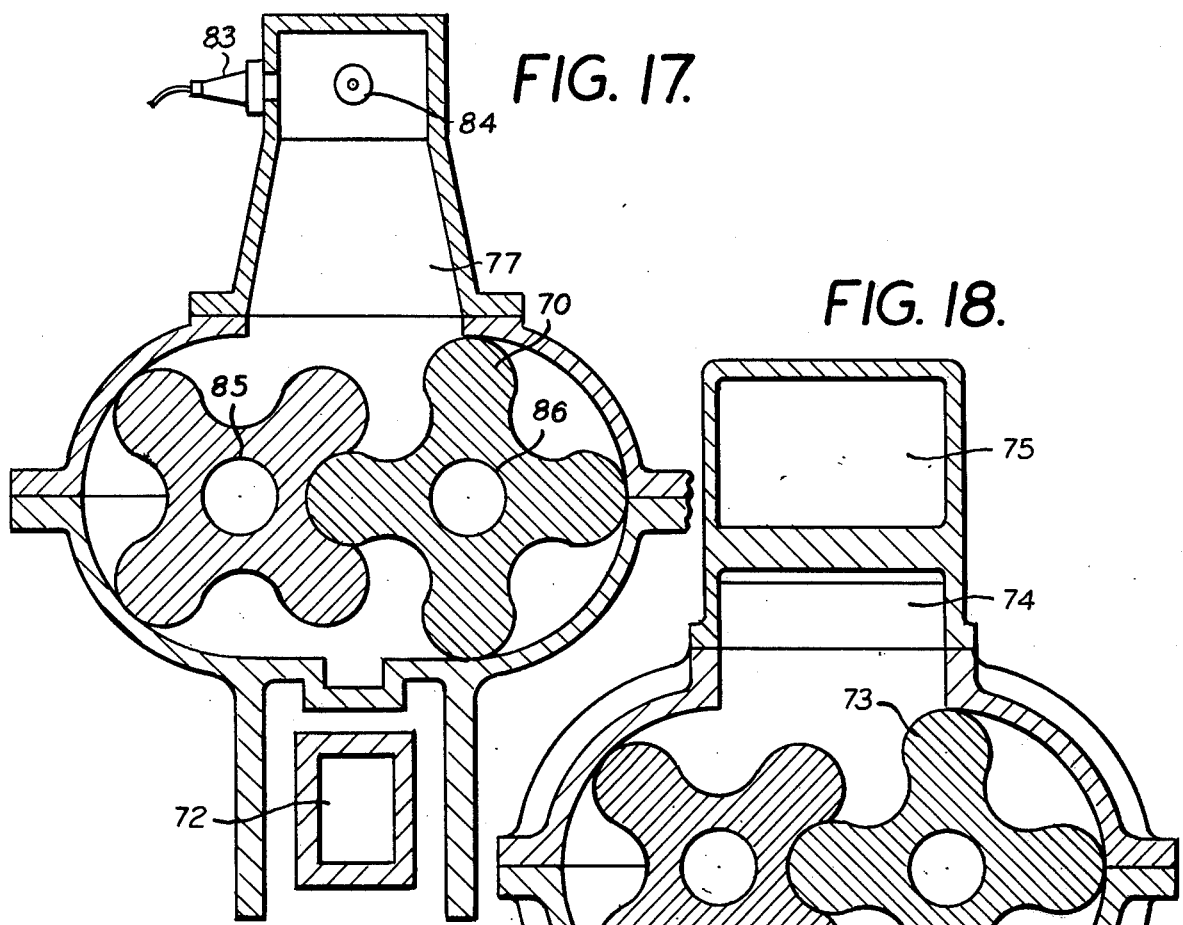
FIG. 17.
FIG. 18.
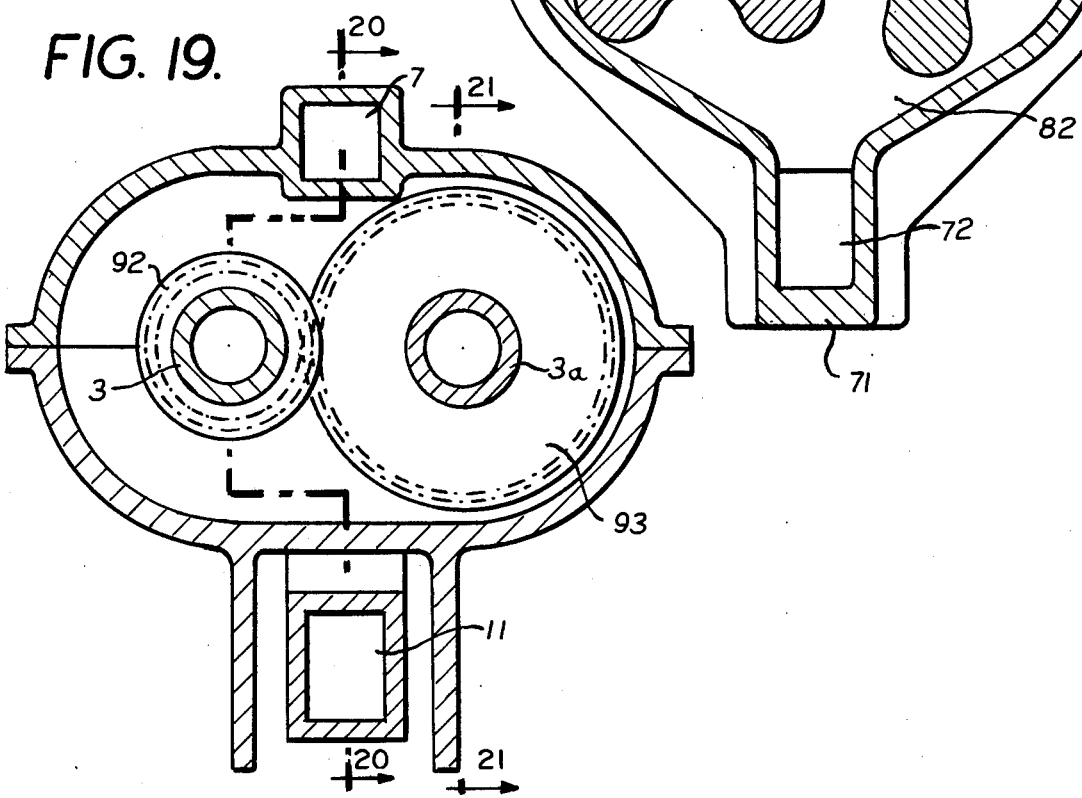
FIG. 19.

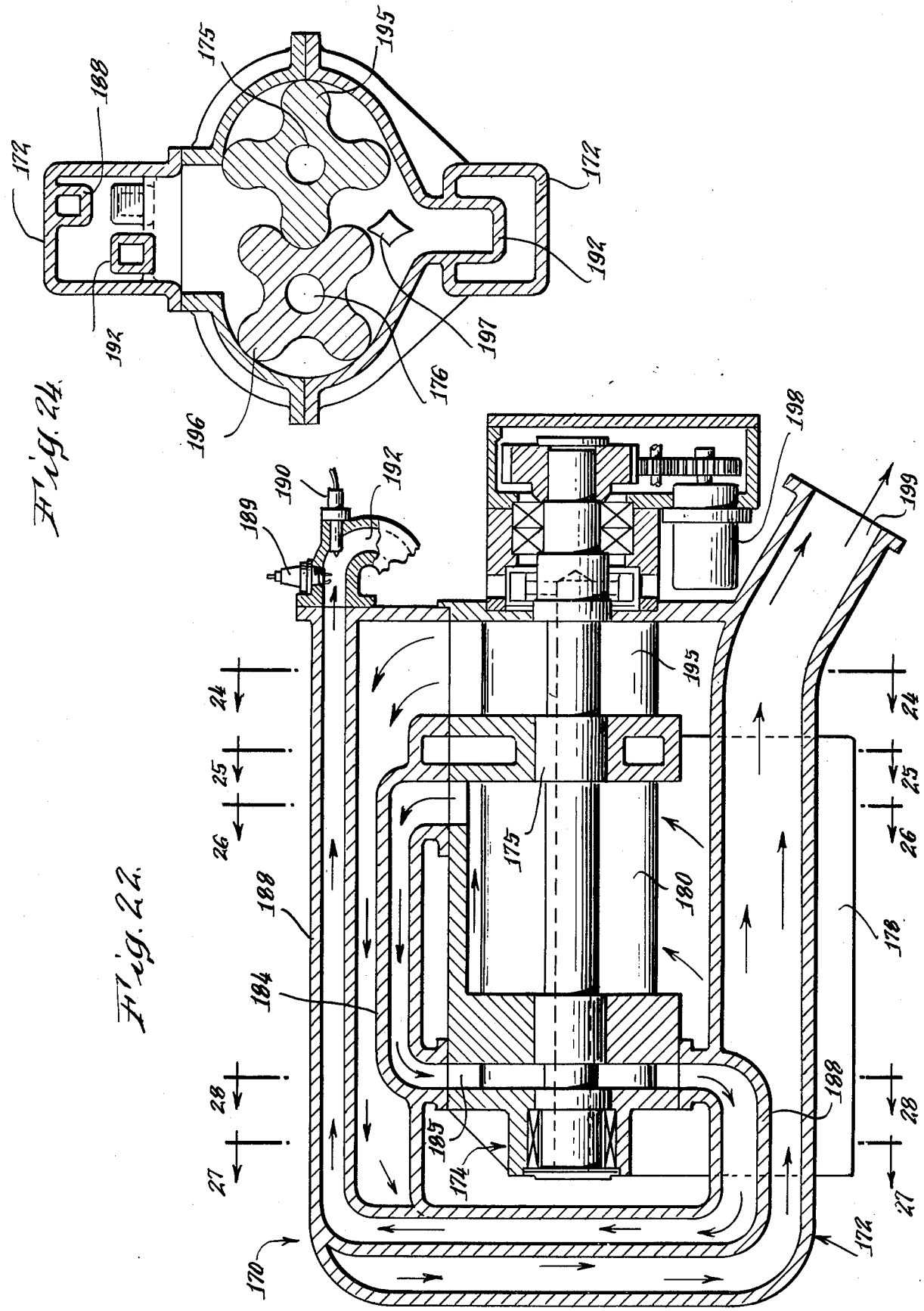

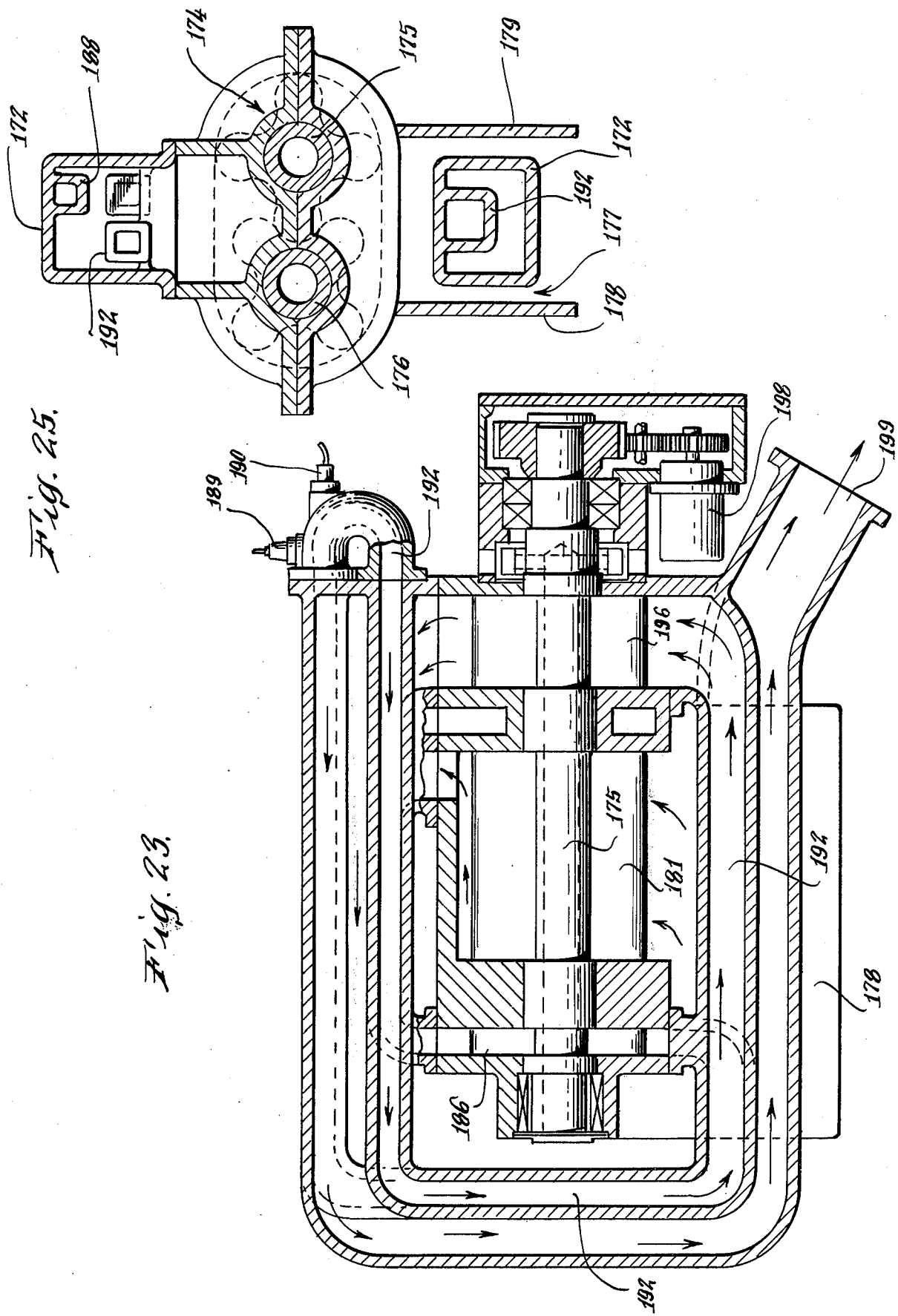

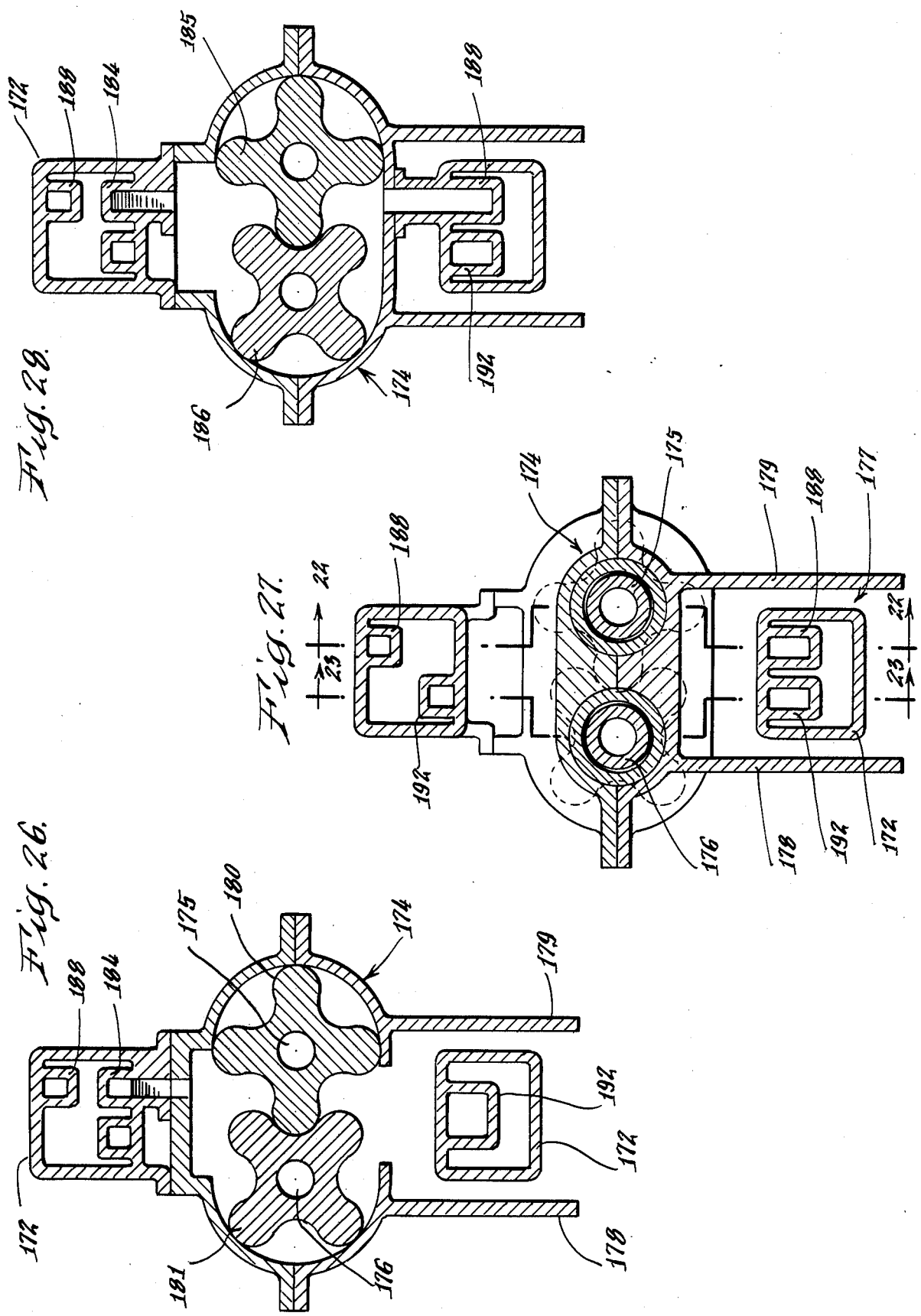

INTERNAL COMBUSTION ENGINE

This application is a continuation-in-part of my application Ser. No. 274,790 filed July 24, 1972, and now abandoned.

BACKGROUND OF THE INVENTION

The present invention relates to an internal combustion engine or gas engine.

Internal combustion engines of the type having a first set of interengaging compression rotors for compressing air entering the engine and a second set of interengaging power rotors for deriving power from a fuel-air mixture ignited within the engine suffer from several drawbacks. First, back pressure from the combustion of the fuel-air mixture within the engine can act on the interengaging compression rotors and thereby stall the engine. This is particularly likely to occur when a large load is placed on the engine, wherein the speed of the interengaging power rotors is sharply decreased.

Also, the efficiency of such engines is not particularly high. These and other problems with such engines have been significantly great enough that there is no known commerically available, widely accepted engine of this type extant at the present time.

SUMMARY OF THE INVENTION

An internal combustion engine according to the invention herein includes a set of interengaging compression rotors in communication with an additional set of interengaging compression and meter rotors, a set of interengaging power rotors and a combustion chamber disposed between the meter rotor and power rotors. The second-stage compression and meter rotors deliver the compressed air to the combustion chamber, but are smaller in working area than the other rotors, and combustion gases expanding within the combustion chamber always act to drive the power rotors rather than to stall the engine by acting on the compression rotors.

In addition, the invention herein contemplates an internal combustion engine with high thermal efficiency. Increases in thermal efficiency are accomplished by inducting air to the engine around the exhaust manifold thereof so that the inducted air is preheated. Other structural configurations which increase thermal efficiency include routing the passage for compressed air extending between the first stage compression rotors and the second stage compression and meter rotors through or adjacent to the exhaust manifold of the engine, whereby the compressed air is further preheated and compressed by thermal expansion, and routing the passage for compressed air extending between the second stage compression and meter rotors and the combustion chamber through or adjacent to the exhaust manifold for the same purposes. In addition, the combustion chamber itself may be contained within the exhaust chamber to prevent rapid cooling of the combustion gases. This encourages complete combustion of the engine fuel, thereby lowering emissions, while also contributing to the thermal efficiency of the engine.

It is one object of the present invention to provide an improved internal combustion engine.

It is another object of the present invention to provide an internal combustion engine wherein the engine further comprises a jet engine.

It is an additional object of the invention to provide an internal combustion engine wherein the inducted air is preheated.

It is a further object of the invention to provide an internal combustion engine wherein compressed air is heated prior to entering the combustion chamber thereof.

It is yet another object of the invention to provide an internal combustion engine having high thermal efficiency.

It is an additional object of the invention to provide an internal combustion engine wherein the heat of the exhaust of the engine is used to increase the thermal efficiency of the engine.

It is a still further object of the invention to provide an internal combustion engine of the type including intermission rotors as an air intake means and compression means which will not stall under loads.

Other and more specific objects of the invention will appear from a persual of the following description of the preferred embodiment and the claims, taken together with the accompanying drawings.

DRAWINGS

FIG. 5 is a sectional view of the internal combustion engine of FIG. 1 taken along the lines 5—5 of FIG. 1;

FIG. 6 is a sectional view of the internal combustion engine of FIG. 1 taken along the lines 6—6 of FIG. 1;

FIG. 7 is a sectional view of the internal combustion engine of FIG. 1 taken along the lines 7—7 of FIG. 1;

FIG. 17 is a sectional view of the engine of FIG. 15 taken along the lines 17—17 of FIG. 15;

FIG. 18 is a sectional view of the engine of FIG. 15 taken along the lines 18—18 of FIG. 15;

FIG. 19 is a cross-sectional view of gear means for selectively increasing the speed of air intake and compression means in engines according to the invention herein taken along the lines 19—19 of FIG. 20;

FIG. 22 is a vertical sectional view of another internal combustion engine according to the invention herein taken along the lines 27—27 of FIG. 27;

FIG. 23 is a sectional view of the internal combustion engine of FIG. 22 taken along the lines 23—23 of FIG. 27;

FIG. 24 is a sectional view of the internal combustion engine of FIG. 22 taken along the lines 24—24 of FIG. 22;

FIG. 25 is a sectional view of the internal combustion engine of FIG. 22 taken along the lines 25—25 of FIG. 22;

FIG. 26 is a sectional view of the internal combustion engine of FIG. 22 taken along the lines 26—26 of FIG. 22;

FIG. 27 is a sectional view of the internal combustion engine of FIG. 22 taken along the lines 27—27 of FIG. 22; and FIG. 28 is a sectional view of the internal combustion engine of FIG. 22 taken along the lines 28—28 of FIG. 22.

The same reference numbers refer to the same elements throughout the various figures.

DESCRIPTION OF PREFERRED EMBODIMENTS

Internal combustion engines according to the invention herein generally comprise a two-stage air intake and compression means which includes a first set of interengaging rotor members for intaking and compressing air, and a second set of interengaging rotor members which deliver the compressed air to a combustion chamber. The combustion chamber is disposed between the air intake and compression means and another set of interengaging rotor members, the output rotors, which are driven by the combustion gases, and power from the output rotors is used to drive the air intake and compression rotors. The sets of rotors may be on common parallel shafts to facilitate this use of power. The air intake and compression rotors and the output rotors are sized to prevent the engine from stalling under heavy loads.

In some embodiments of engines disclosed herein, high thermal efficiency is achieved by positioning the exhaust passages in the air intake opening to heat incoming air. This principle is further utilized by placing the compressed air passageways and the combustion chamber itself within or adjacent to the exhaust passageway to achieve and maintain high thermal efficiency and complete combustion.

In some embodiments, a second combustion chamber comprising a jet chamber and nozzle are provided. In further embodiments, gears are provided to selectively increase the speed of the air intake and combustion rotors relative to the output rotors, and thereby increase the compression of intaken air and up the power of the engine.

All of the features generally described above may be combined in one engine, or various combinations of the features can be used in a particular engine. Accordingly, the following description of preferred embodiments includes examples of internal combustion engines which incorporate various ones of the features of the invention herein.

Figure 9:
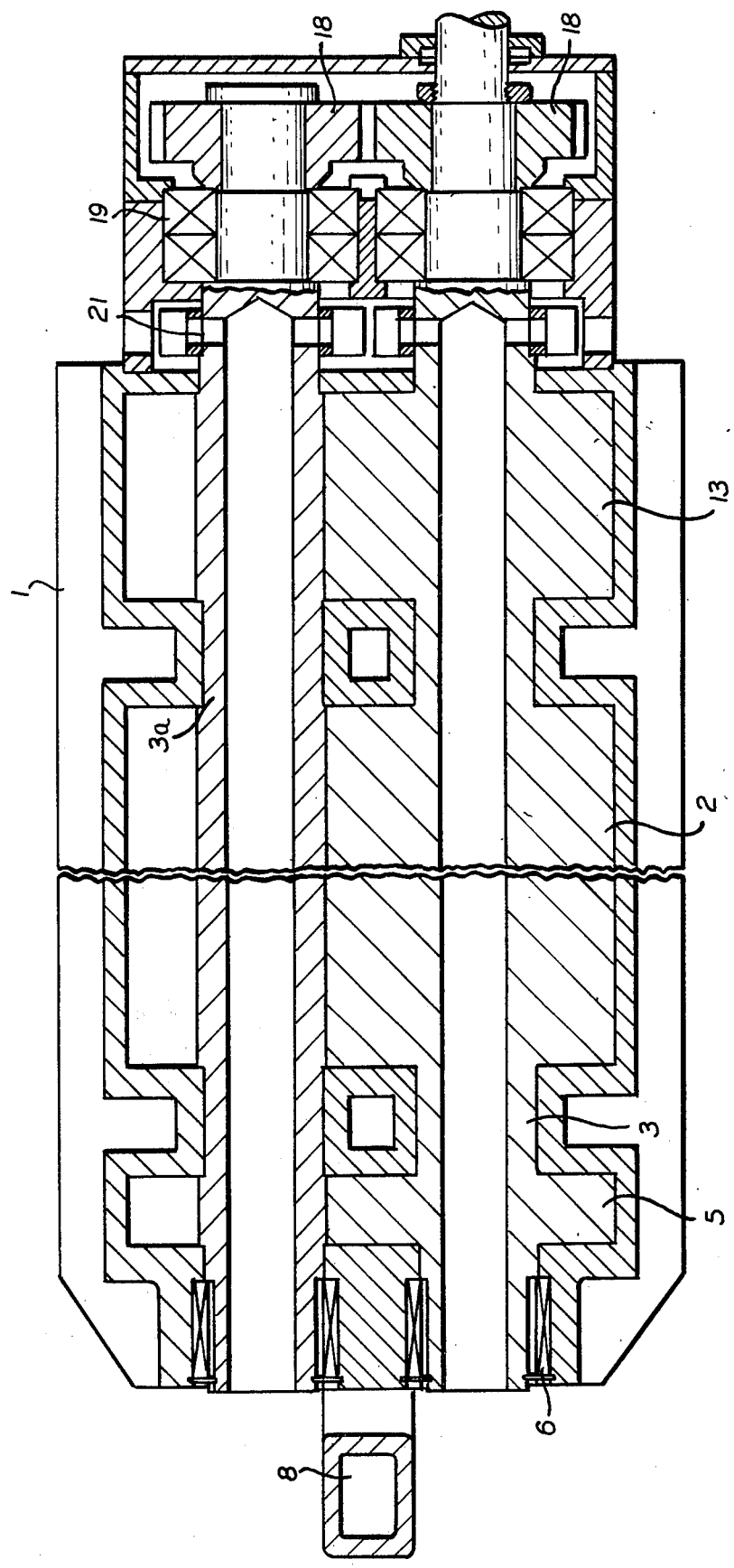
FIG. 9 is a sectional view of the internal combustion engine of FIG. 1 taken along the lines 9—9 of FIG. 1.

Referring now to the drawings, and more particularly to FIGS. 1–9, a first embodiment 100 of an internal combustion engine according to the present invention is disclosed. The engine 100 comprises a housing 1, in which is disposed a first stage of an air intake and compression means comprising a pair of interengaging rotor wheels 2 and 22 respectively rigidly mounted on parallel hollow shafts 3 and 3a which are rotatably mounted in the housing 1. The rotor wheels 2 and 22 have spokes 2a and 22a, respectively (FIG. 5), which intermesh with each other, one rotor wheel turning clockwise and the other turning counterclockwise, and the rotor wheels cooperate to define a rotary expansible chamber type motor. The shafts 3 and 3a extend longitudinally through the housing 1 as best seen in FIG. 9. Bearings 6 are provided for the rotatable shafts 3 and 3a.

The housing 1 forms a constricted air passageway 4 extending from the outlet portion 2' of the first stage air intake and compression means to a second stage thereof comprising a second pair of intermeshing or interengaging rotor wheels 5 and 105 respectively rigidly mounted on the shafts 3 and 3a. The axial width of the second pair of rotor wheels 5 and 105 is shorter than that of the rotor wheels 2 and 22.

The housing 1 further defines a passageway 7 communicating with an outlet portion of the second stage of the air intake means and then defines, at a right angle change of direction, a combustion chamber 8 having mounted in the wall of the housing thereat a fuel injection device 9 and further downstream therefrom an ignition device 10, and still further downstream therefrom a water spray means 11a.

Figure 3:
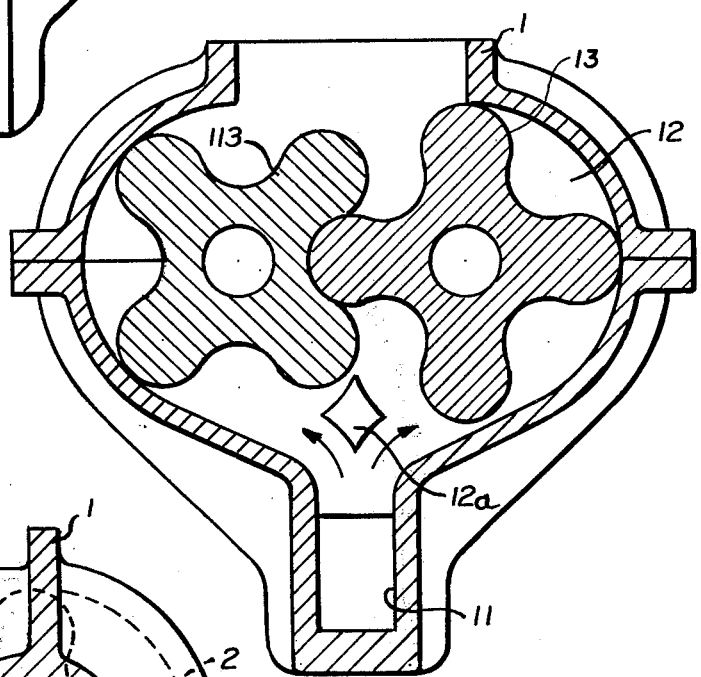
FIG. 3 is a sectional view of the internal combustion engine of FIG. 1 taken along the lines 3—3 of FIG. 1.
Figure 4:
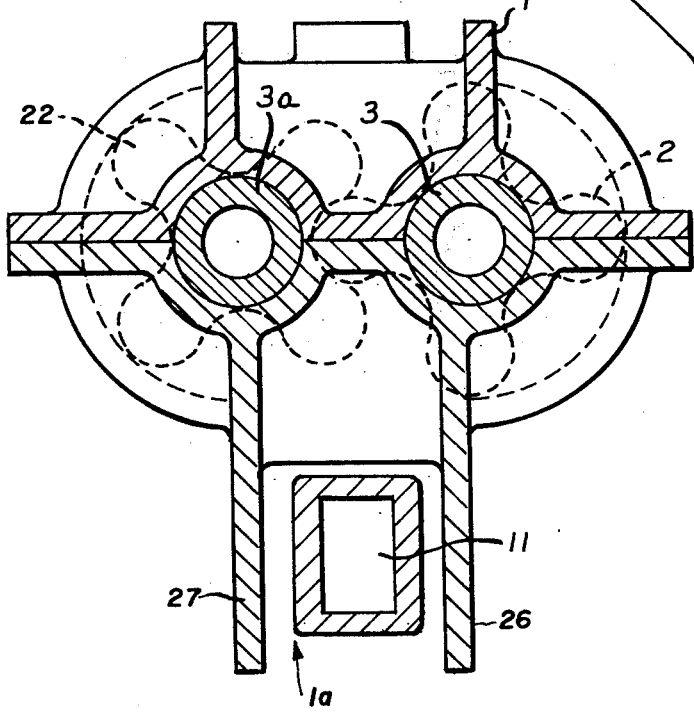
FIG. 4 is a sectional view of the internal combustion engine of FIG. 1 taken along the lines 4—4 of FIG. 1.
Figure 8:
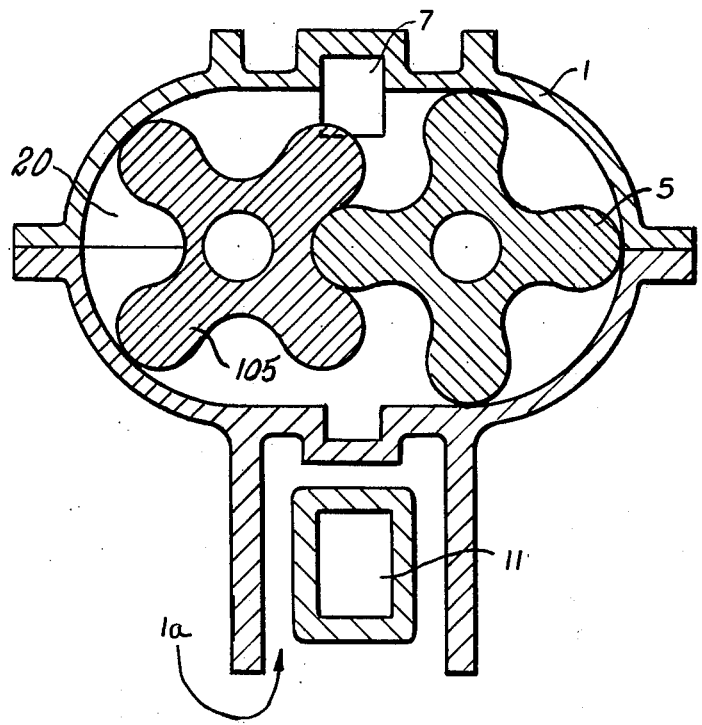
FIG. 8 is a sectional view of the internal combustion engine of FIG. 1 taken along the lines 8—8 of FIG. 1.

Extending from an outlet portion of the combustion chamber 8 at a right angle change of direction is a longitudinal passageway 11. The passageway 11 may be considered as a portion of the combustion chamber in that further burning of the fuel-air mixture may take place in passageway 11, and passageway 11 serves to confine the gases of combustion. The passageway 11 extends to a point rearward of the first stage of the air intake means and communicates with a chamber 12 in which is disposed an output means comprising a pair of interengaging output rotor wheels 13 and 113 which are respectively rigidly mounted on the shafts 3 and 3a. A baffle 12a is provided between and below rotors 13 and 113, as seen in FIG. 3. An outlet 25 for the exhaust gases is provided. The rotor wheels 13 and 113 have an axial width which is smaller than that of the wheels 2 and 22 and greater than that of the rotor wheels 5 and 105.

At the end of the housing 1, adjacent the output means, although not limited thereto, a start-up motor 14 is provided having an output shaft 15, on which is disposed a gear 16. An intermediate transfer gear 17 meshes with the gear 15 and transmits the motion thereof to gears 18 which are operatively connected to operatively drive the shafts 3 and 3a. See FIGS. 1 and 9. Bearings 19 are provided for the corresponding end portion of the shafts 3 and 3a.

Figure 2:
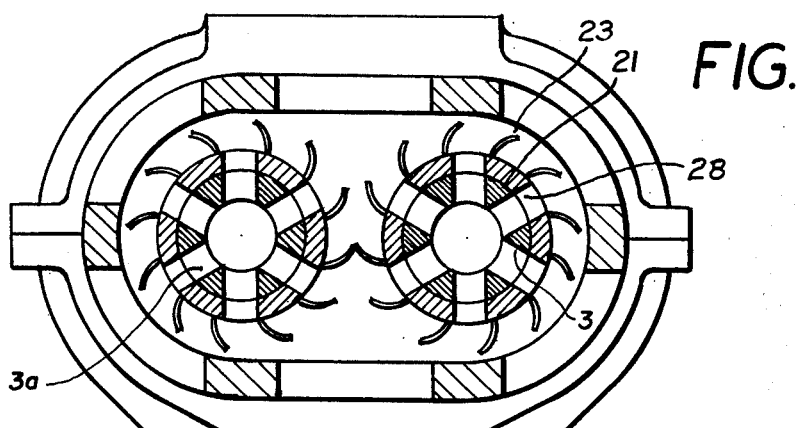
FIG. 2 is a sectional view of the internal combustion engine of FIG. 1 taken along the lines 2—2 of FIG. 1.

Cooling rotors 21 are rigidly mounted on the shafts 3 and 3a, as shown in FIG. 2, and the cooling rotors each have curved fan blades 23 thereon. The rotors are formed with radially open channels 28 extending to the interiors of the hollow shafts 3 and 3a. The fan blades 23 are curved in the direction of rotation of the respective rotors 21 for directing cooling air into the channels 28 and into the shafts 3 and 3a for cooling purposes.

In operation of the internal combustion engine 100, the start-up motor 14 is activated initially and turns the output shaft 15 and the cooperating gears 16, 17 and 18, thereby rotating the shafts 3 and 3a. The rotation of the shafts 3 and 3a causes the turning of all the interengaging rotor wheels rigidly mounted to the shafts, and the first stage of the air intake means, namely rotor wheels 2 and 22 cause air to be sucked therein through an air inlet opening 1a defined between two parallel facing plates 26 and 27 depending from housing 1. It should be noted that the portion of the housing defining passageway 11 which contains hot gases of combustion extends between plates 26 and 27, whereby incoming air is preheated.

The entering air is compressed after passing through interengaging rotor wheels 2 and 22 and flows under pressure into the constricted passageway 4, in which the compressed air increases its velocity because of the small cross-sectional area of passageway 4. From there, the compressed air enters the second stage of the air intake means, namely the interengaging compression and meter rotor wheels 5 and 105, and the rotor wheels 5 and 105 cause a further compression of the air, e.g., in one preferred embodiment, the pressure is many times as great at the outlet of the second stage as at the outlet of the first stage. The rotor wheels 5 and 105 positively deliver "metered" amounts of the compressed air to the passageway 7 and thereby to the combustion chamber 8, the "metered" amount comprising four times the volume of one of the moving pockets 20 formed between the rotors and the walls of housing 1 per revolution of each rotor.

The highly compressed air enters the channel 7 and passes to the combustion chamber 8. At the entrance of the combustion chamber, an atomized fuel spray is injected by fuel injector device 9, after which the highly compressed fuel-air mixture is ignited by the ignition device 10, and combustion occurs. The expanding combustion gases then pass through the longitudinal channel 11 into output chamber 12 and are directed by the baffle 12a suitably toward the pair of interengaging output rotor wheels 13 and 113, which are rapidly rotated by the combustion gases and impart useable power to shafts 3 and 3a. The water spray device provides a spray of water into the combustion gases and promotes prolonged and complete combustion of the fuel.

Once combustion begins and the output rotor wheels 13 and 113 are rapidly rotated thereby causing rotation of the shafts 3 and 3a, the rotors 2 and 22 and rotors 5 and 105 rigidly mounted to the shafts 3 and 3a are also rotated, causing operation of the first and second stages of the air intake means. Thus further intake and compression of air and further combustion is accomplished, perpetuating the cycle continuously through the energy supplied by the injected fuel. At this time, after the inception of combustion, the start-up motor 14 may be turned off, and the engine 100 operates on its own generated power. The combustion gases, after doing their useful work, leave the output chamber 12 through exhaust outlet 25. Power generated in this fashion may be used to do active work and can be taken off in any suitable location from the shafts 3 and 3a.

If a large load is placed on the engine, which slows the rotation of shafts 3 and 3a and the rotors rigidly connected thereto, compression gases back up and do work against the compression and metering rotors 5 and 105. However, the working area of these rotors is, by virtue of their shorter axial length, less than the working area of the output rotors 13 and 113. Therefore, the engine always runs forward and resists stalling, while still incorporating large intake and compression rotors 2 and 22 to achieve a high volume of air intake and high compression thereof.

Figure 10:
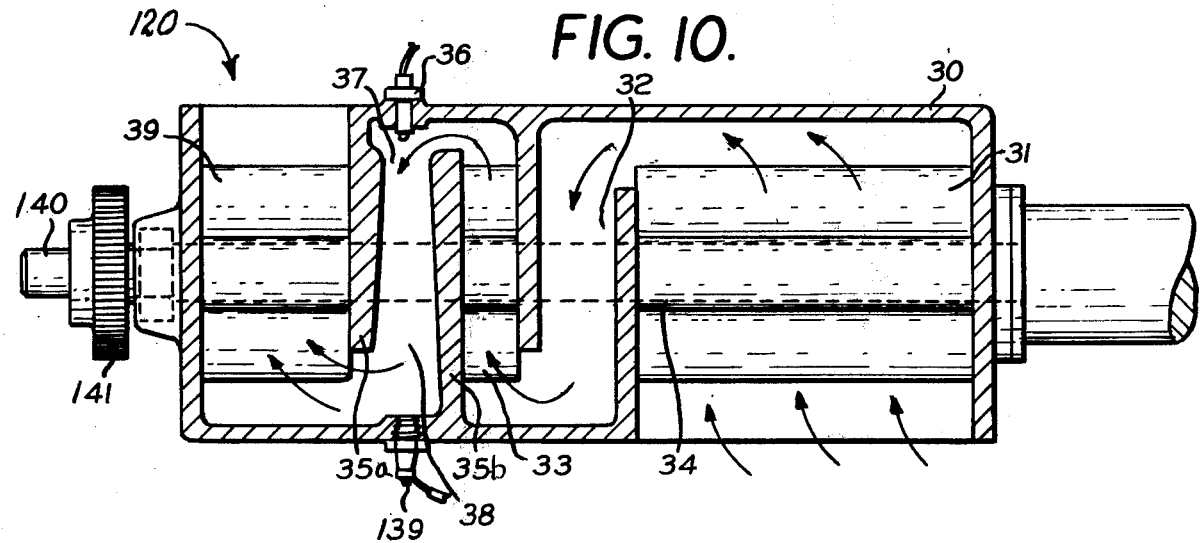
FIG. 10 is a vertical sectional view of another internal combustion engine according to the invention herein.

Referring now to FIG. 10, another embodiment of the present invention is disclosed. In this embodiment an internal combustion engine 120 comprises a housing 30 having rotatable shafts 34 and 34a (34a being in the foreground and not shown) longitudinally disposed therein. Interengaging intake and compression rotor wheels 31 and 31a (not shown) constituting the first stage of the air intake means, are respectively rigidly mounted on the shafts 34 and 34a, whereby air is sucked in and compressed by the rotor wheels 31 and 31a. The compressed air passes through a constricted passageway 32, which is vertically oriented and into second stage interengaging compression and meter rotor wheels 33 and 33a (not shown) which are likewise respectively rigidly mounted on the shafts 34 and 34a and provide a further compressing of the air.

The housing 30 comprises downwardly diverging walls 35a and 35b constituting a combustion chamber 38, which receives the compressed gases positively delivered from the second compression and metering stage comprising the rotor wheels 33 and 33a. A fuel injection device 36 is provided at the entrance and narrowmost portion between the walls 35a and 35b, and sprays fuel into the combustion chamber. The compressed air entering therein is intimately mixed with the atomized fuel, and is initially combusted by an ignition device 139 disposed at the widened bottom outlet portion of the combustion chamber 38. Immediately adjacent to the combustion chamber 38, the explosive gases enter and rapidly rotate output rotor wheels 39 and 39a (not shown) which are respectively rigidly mounted on the shafts 34 and 34a. As in the previous embodiment, the combustion gases by turning of the output rotor wheels 39 and 39a effect the driving of the intake and compression rotor wheels 31 and 31a and the compression and metering rotor wheels 33 and 33a of the first and second stages of the air intake means. An output portion 140 of the shaft 34 contains mounted thereon a gear 141 by which useful output energy may be taken off the shaft and utilized. A start-up motor may be used for initially starting the engine 120 as in the embodiment of FIG. 1, but is not shown in FIG. 10 for clarity. The start-up motor is stopped as soon as combustion begins and the combustion gases themselves effect the turning of the output shaft 34, causing the turning of the air intake means. The engine 120 also has the anti-stall attributes of the engine 100 described above by virtue of the second stage compression and meter rotors 33 and 33a and their short axial width compared to the output rotors 39 and 39a.

Referring now to the drawings and more particularly to FIGS. 11-14, another embodiment of the present invention is disclosed as a jet engine 130. It comprises a housing 40 containing a pair of first stage air intake can compression rotor wheels 41 and 41a mounted on hollow rotatable shafts 42 and 43, respectively. Inlet air, as illustrated by the left-most arrows 44 in FIG. 12, enters into the first stage rotor wheels 41 and 41a and is compressed thereby. The housing 40 is narrowed at constriction portion 45 causing an increase in the velocity of the air entering a second stage of the air intake means, namely rotor wheels 46 and 46a which are mounted on rotatable shafts 47 and 48, in a first upper branching conduit 1b of the housing 40. The compressed air then passes into a combustion chamber portion 49 in a narrow end of a jet chamber 52, where fuel is injected by injection device 50 and the fuel-air mixture is ignited by ignition device 51. The expanding combustion gases then exit through the rear opening in the jet chamber 52, and tend to propel the engine 120 forwardly.

Figure 11:
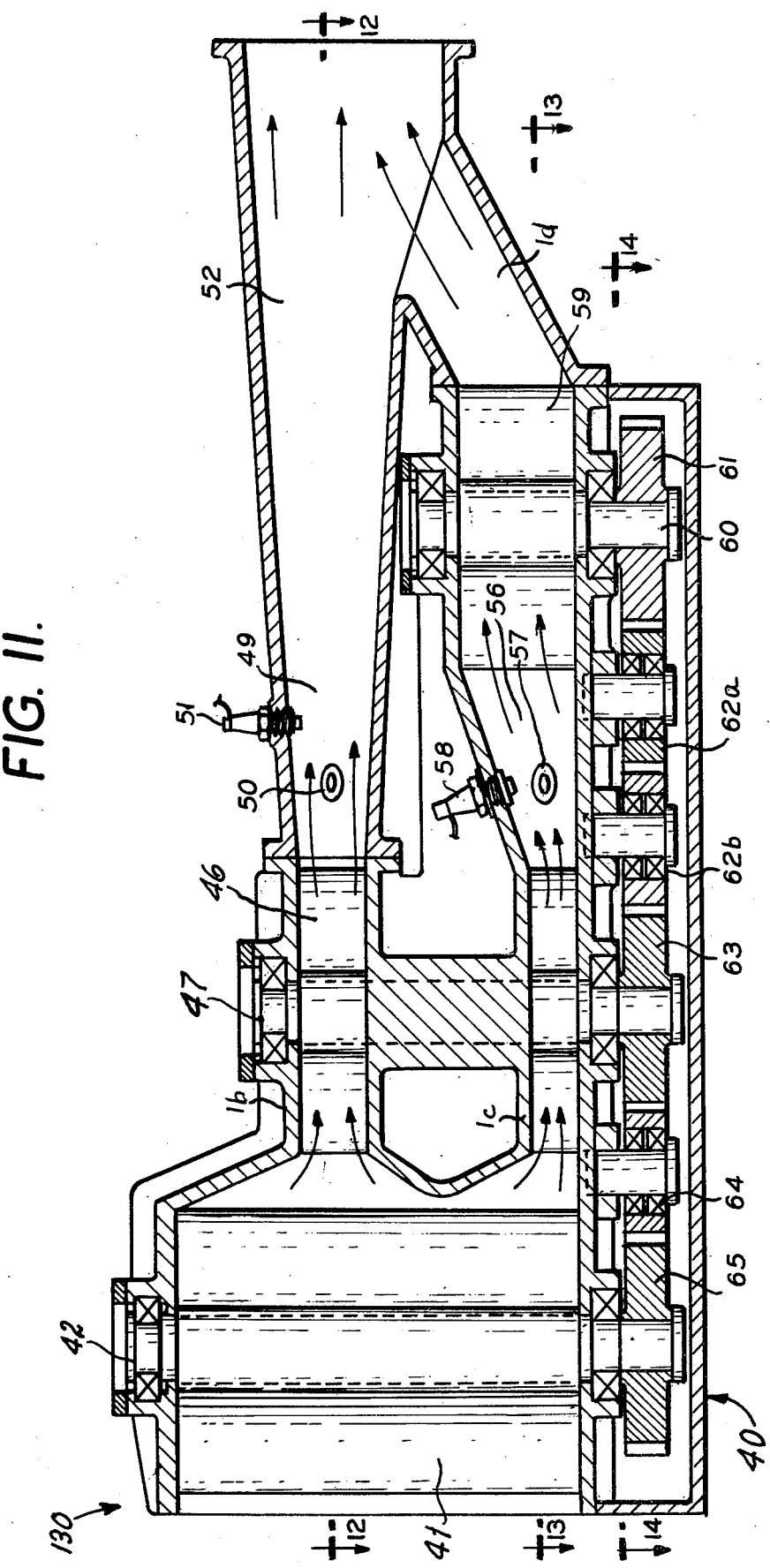
FIG. 11 is a vertical sectional view of yet another engine incorporating jet propulsion according to the invention herein.
Figure 12:
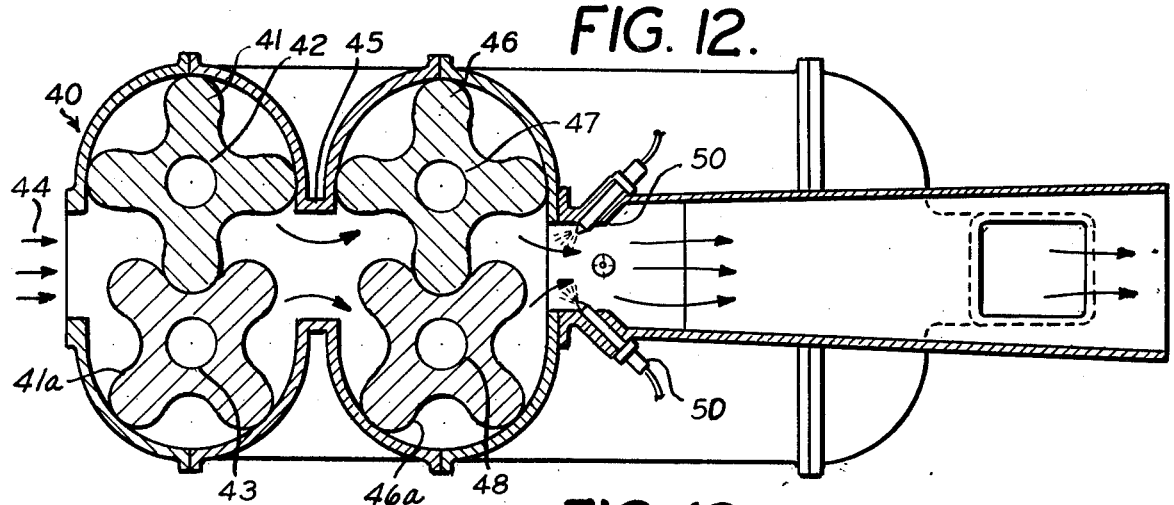
FIG. 12 is a sectional view of the engine of FIG. 11 taken along the lines 12—12 of FIG. 11.
Figure 13:
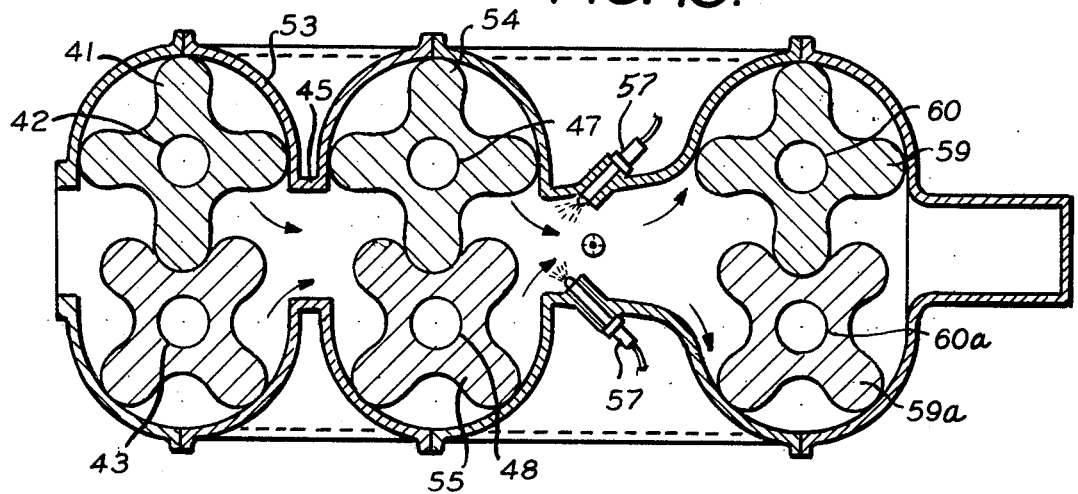
FIG. 13 is a sectional view of the engine of FIG. 11 taken along the lines 13—13 of FIG. 11.

As illustrated in FIGS. 11 and 13, the housing 40 forms a second lower branching conduit 1c parallel to the conduit 1b. The shafts 47 and 48 also pass through the conduit 1c and another second stage of the air intake means as provided therein, namely compression and metering rotor wheels 54 and 55, rigidly mounted on the shafts 47 and 48, respectively. A combustion chamber 56 is disposed in the branch conduit 1c adjacent the outlet of the second stage of the air intake means, which delivers highly compressed air to the combustion chamber. Fuel is injected by injection device 57 and the resultant fuel-air mixture is ignited by ignition device 58, whereupon the expanding gases pass through output rotor wheels 59 and 59a, rigidly disposed on rotatable shafts 60 and 60a respectively, to do useful work. The exhaust gases exiting from output rotors 59 pass through a passageway 1d into the rear of the jet chamber 52 for exit therefrom. Note that the compression and metering rotors 54 and 55 prevent back pressure from the combustion chamber from working on the larger intake and compression rotors 41 and 41a.

Figure 14:
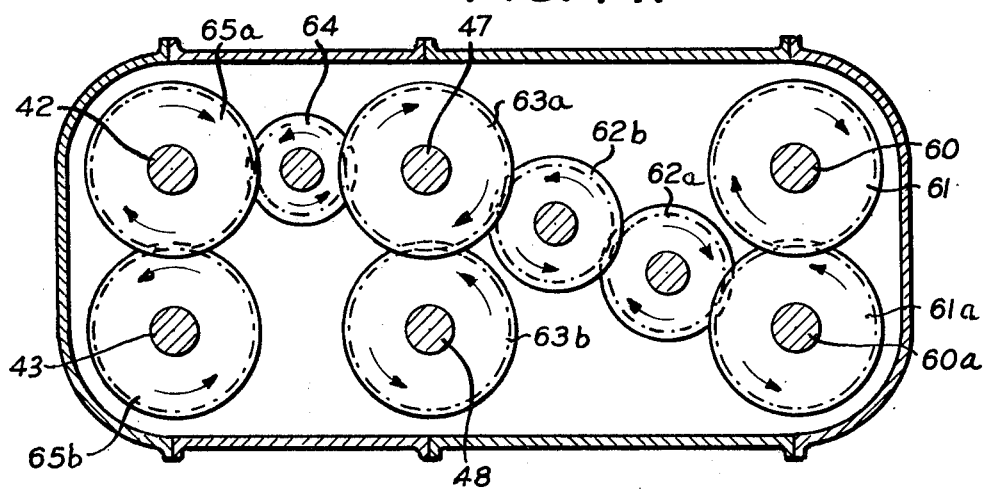
FIG. 14 is a sectional view of the engine of FIG. 11 taken along the lines 14—14 of FIG. 11.
Figure 15:
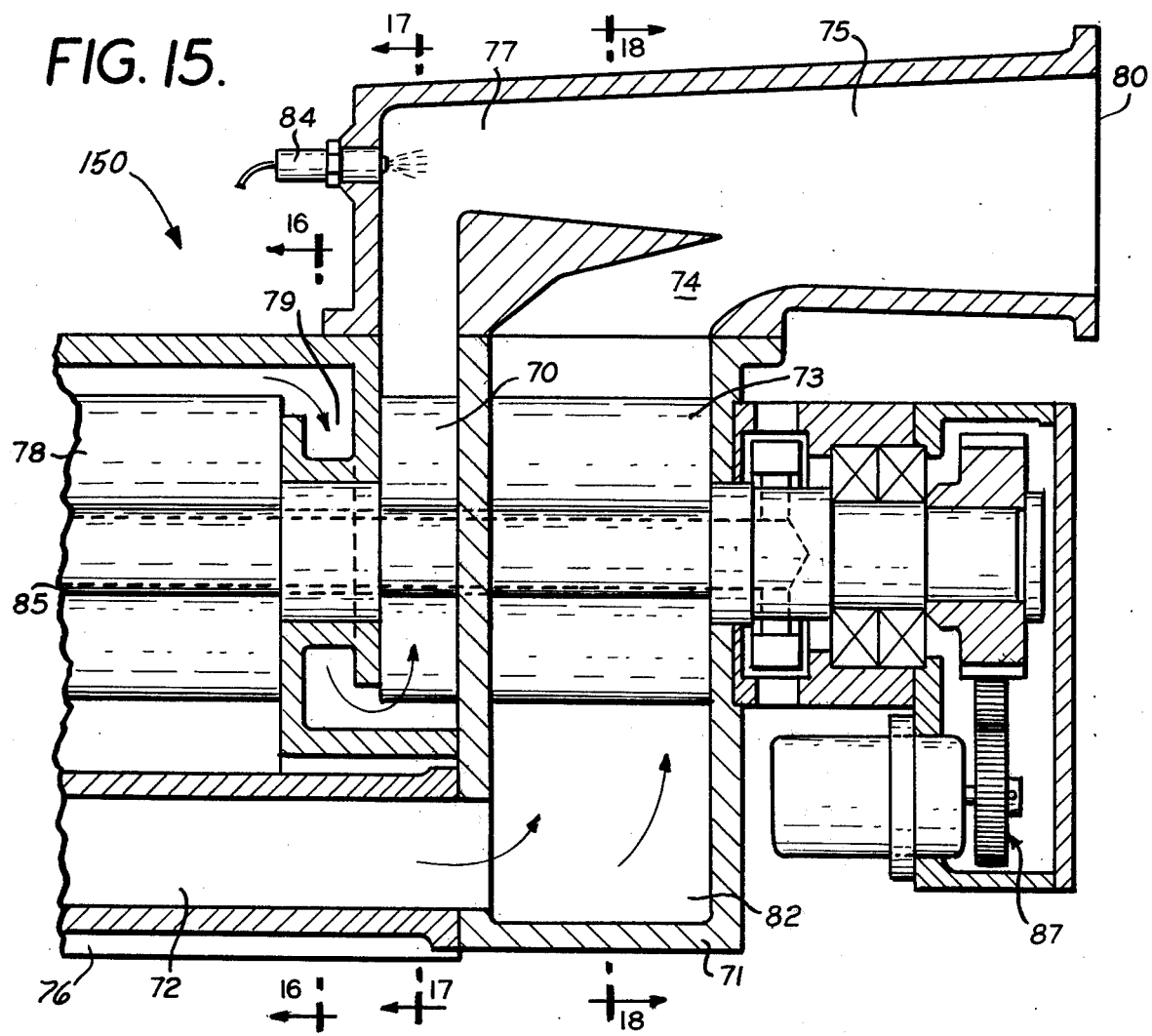
FIG. 15 is a vertical sectional view, partly broken away, of another engine incorporating jet propulsion according to the invention herein.
Figure 16:
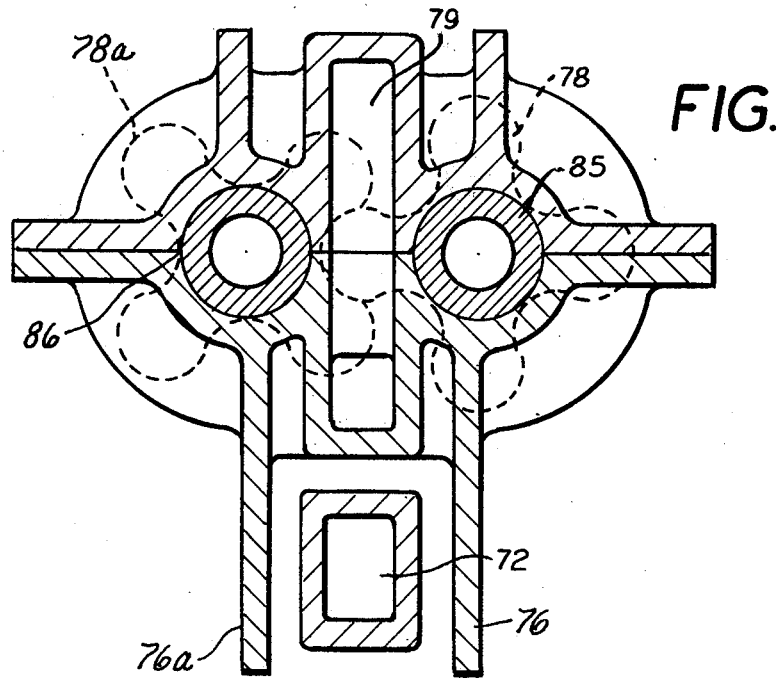
FIG. 16 is a sectional view of the engine of FIG. 15 taken along the lines 16—16 of FIG. 15.

The rotation of the shafts 60 and 60a by the output rotor wheels 59 and 59a causes the rotation of a plurality of gears which are the driving means for the air intake stages. The gears are operatively interconnected to each other and thereby to the shafts 42, 43, 47 and 48, which shafts are all disposed parallel to each other and carry the rotor wheels 41, 41a, 46 and 46a. Namely, as shown in FIGS. 11 and 14, gear 61 on one of the shafts 60 turns meshing gear 61a on the other shaft 60a and via a pair of transmission gears 62a and 62b, turns a gear 63a mounted on the shaft 47 to turn shaft 47. Gear 63a intermeshes with a gear 63b mounted on the shaft 48 to turn shaft 48. A transmission gear 64 is operatively mounted to gears 63a and 65a for turning the latter gear, which is mounted on shaft 42 of the first stage of the air intake means. The gear 65a meshes with a gear 65b mounted on the other shaft 43 and shaft 43 is thereby turned. Accordingly, by the above described gears, the combustion gases turn the output rotor wheels 59 and 59a which turn the shafts 60 and 60a and thereby turn the other shafts and associated rotor wheels of the air intake means.

A start-up motor for initial starting and driving of the air intake means may be provided, but is not illustrated here for clarity, and once combustion is started the output rotor wheels 59 and 59a and the aforementioned gears operate the air intake means, and the start-up motor may be stopped.

Referring now to the drawings, and more particularly to FIGS. 15–18, there is shown another embodiment of the present invention as a jet engine 150. It comprises a housing 71 which forms a passageway 72, similar to passageway 11 of FIG. 1, wherein combustion gases enter from a combustion chamber and an air intake means (not shown) which may be similar to that shown in FIG. 1. The combustion gases in passageway 72 pass into an output chamber 82 and drive output rotor wheels 73 and 73a disposed therein and rigidly mounted on rotatable shafts 85 and 86. The exhaust gases from the output rotors 73 and 73a exit at exit passage 74 into a jet chamber 75 and leave the jet chamber at exit opening 80 thereof.

The jet chamber forms another combustion chamber 77 at its narrowmost portion. A first stage of another air intake means, namely interengaging rotor wheels 78 and 78a are mounted rigidly on shafts 85 and 86, respectively, and air is compressed by rotor wheels 78 and 78a. The compressed air enters into constricted passageway 79 where its speed is increased and the compressed air then passes into a secondary stage of the air intake means, namely rotor wheels 70 and 70a, which are also mounted rigidly on the shafts 85 and 86, respectively, whereby the air is further compressed, and delivered into the combustion chamber 77. Fuel is sprayed therein by a fuel injection means 84 and the resultant fuel-air mixture is ignited by an ignition device 83. (See FIG. 17) The expanding gases of the resulting combustion then jet through the jet chamber 75 and out through the jet opening 80 providing the jet propulsion force. The interengaging rotors 70 and 70a, in addition to further compressing air entering the combustion chamber 77, prevent back pressure from the combustion chamber 77 from working on the larger air intake rotor wheels 78 and 78a. The air entering the engine toward the air intake rotors 78 and 78a passes over the hot passageway 72, being directed by depending parallel facing plates 76 and 76a, whereby it is preheated.

As in the previous embodiments, the shafts 85 and 86 are initially driven by a start-up system 87 which is turned off after combusting gases sufficiently drive the output rotor wheels 73 and 73a, which in turn drive the shafts 85 and 86 and the air intake rotor wheels 78, 78a, 70 and 70a.

Figure 1:
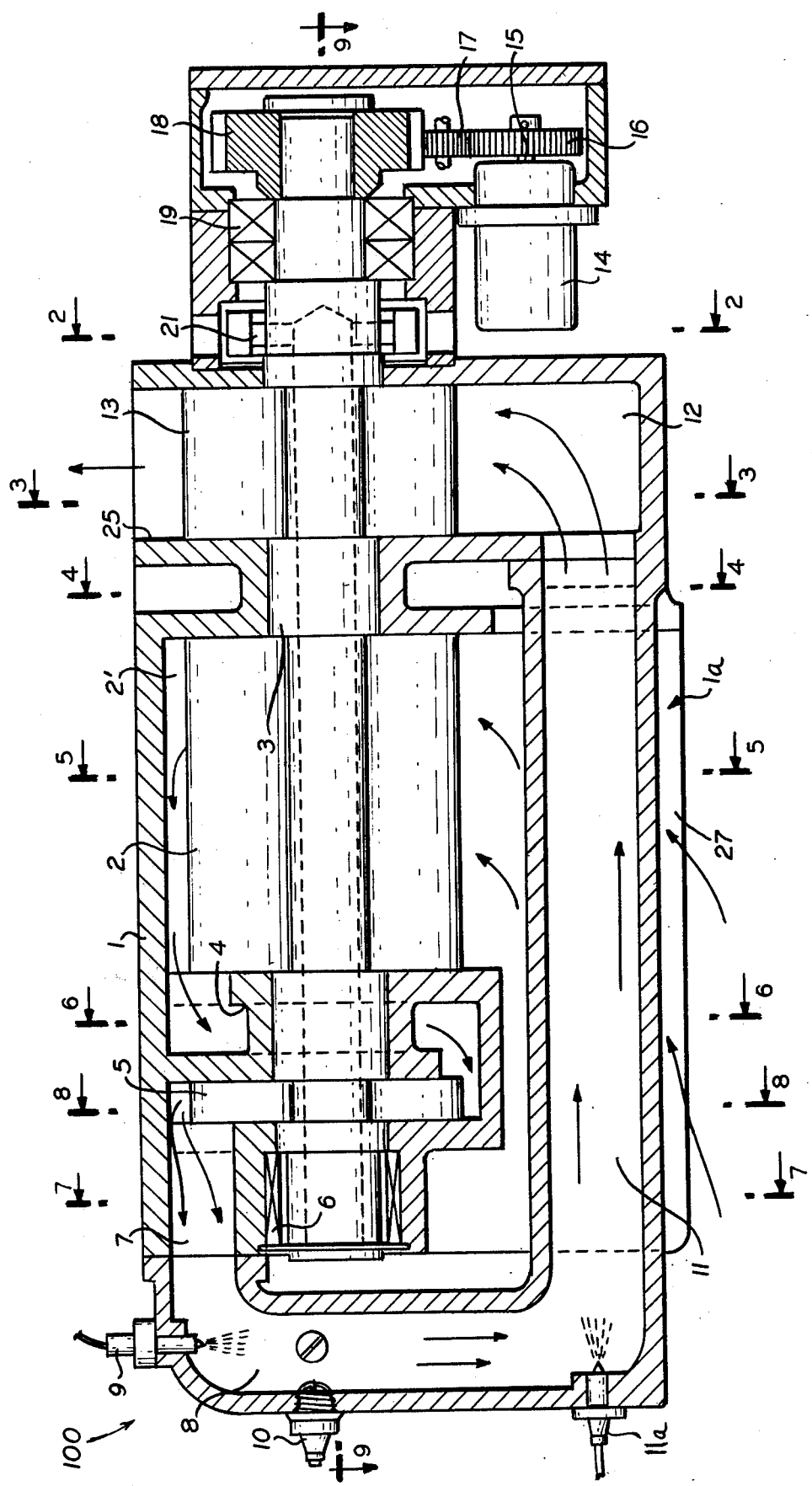
FIG. 1 is a vertical longitudinal sectional view through one embodiment of an internal combustion engine according to the invention herein.
Figure 20:
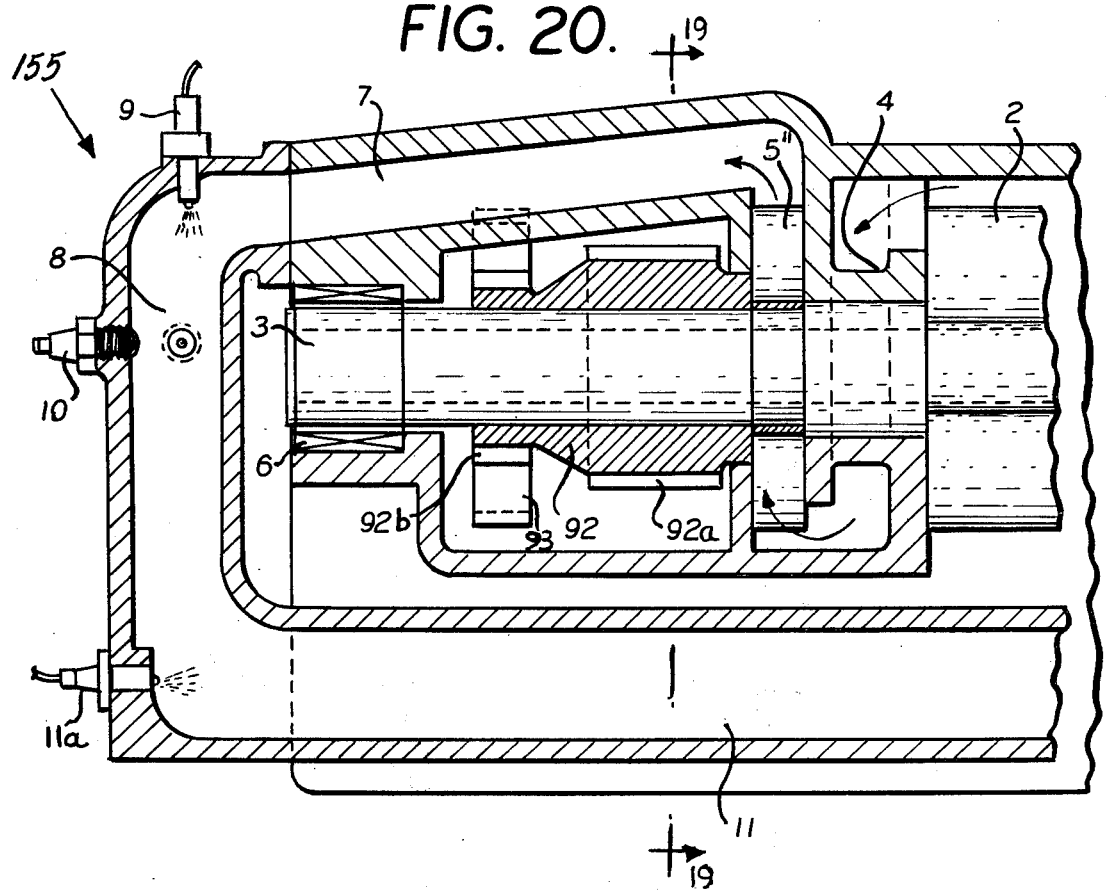
FIG. 20 is a sectional view of the gear means of FIG. 19 taken along the lines 20—20 of FIG. 19.
Figure 21:
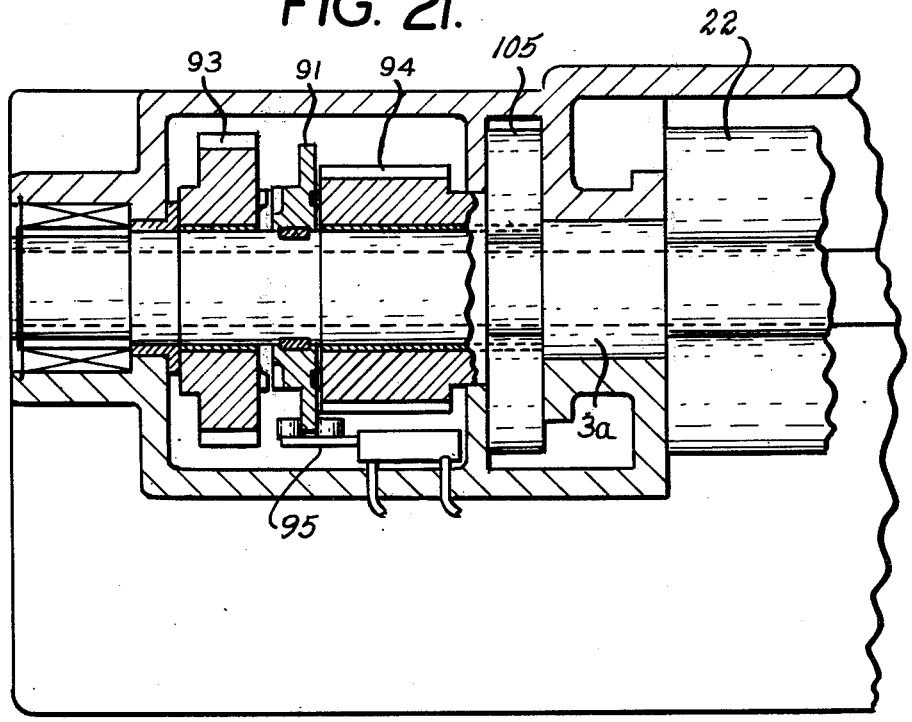
FIG. 21 is a sectional view of the gear means of FIG. 19 taken along the lines 21—21 of FIG. 19.

Referring now to the drawings, and more particularly to FIGS. 19, 20, and 21, there is shown engine 155 which is still a further embodiment of the present invention, following that of FIG. 1, and having the same reference numerals for similar parts which accordingly will not be again described. Engine 155 differs from those previously described in that it includes means for selectively increasing the speed at which the compression and metering rotors turn. To this end, and as best seen in FIG. 21, gears 93 and 94 freely disposed on shaft 3a, and a longitudinally shiftable coupling member 91 is keyed to the shaft 3a between gears 93 and 94. The rotor wheel 105 of the second stage of the intake means, is also freely mounted on the shaft 3a. As best seen in FIG. 20, an integral gear 92 having different radii gears 92a and 92b is freely mounted on the longitudinal shaft 3 and is severely connected to rotor wheel 5 for joint rotation, therewith, rotor wheel 5 being freely mounted on the shaft 3. Rotor wheel interengages with rotor wheel 105 to further compress and deliver air to the combustion chamber 8.

The gears 94 and 92a mesh with one another and the gears 93 and 92b mesh with one another. The rotation of the shaft 3a turns the longitudinally shiftable coupling member 91 and by means of an actuating member 95, the coupling member 91 is selectively engaged with either the gear 93 or 94 for joint rotation therewith. If the coupling member 91 is engaged with the gear 93, then the latter operatively turns the gear member 92 by its smaller radial gear portion 92b, causing a high speed of rotation of the gear member 92 and the rotor wheel 5 connected thereto. The rotor wheel 105 is also driven at the high speed by its interengaging relationship with rotor wheel 5 and the net result is that a high volume of highly compressed air is delivered to the combustion Chamber 8. The output of the engine is at a high level in this mode of operation.

If the coupling member 91 is engaged with and turns gear 94 which is meshed with the gear portion 92a of gear member 92, the rotor wheel 5 is turned at a slower rate and jointly turns the interengaged rotor wheel 105. Thus a smaller amount of comopressed air is delivered to combustion chamber 8 and the engine runs at a lower power output. However, upon shifting of the coupling member 91 into the larger diameter gear 93, the speed of the gear 92 will be increased and transmitted to the wheel 5 to increase the output of the engine. The activating member 95, used to achieve the selective positioning of coupling member 91, may comprise the shaft of a solenoid.

There is shown in FIGS. 22–28 an internal combustion engine 170 comprising yet another embodiment of the invention herein. The internal combustion engine 170 is characerized by an exhaust manifold 172 which is disposed about three sides of the engine and which passes through the air intake to the engine for preheating air entering therein. The exhaust manifold also surrounds passageways for conveying compressed air through the various stages of the engine to heat the compressed air, and further surrounds the combustion chamber of the engine to prevent rapid cooling thereof. All of these features, which will be more fully discussed hereafter, contribute to high thermal efficiency and low emission in this embodiment of the engine.

Referring now to FIG. 22, the internal combustion engine 170 comprises a housing 174 in which two parallel shafts 175 and 176 are rotatably mounted. An air intake, indicated at 177, is provided between two parallel facing plates 178 and 179 depending from the housing 174. (See FIG. 25). The exhaust manifold 172 passes between the parallel facing plates 178 and 179 to preheat air entering the engine.

Air is drawn into the air inlet opening 177 and compressed by a first set of interengaging air intake and compression rotor wheels 180 and 181 rigidly mounted on the parallel shafts 180 and 181, respectively. Air compressed by rotor wheels 180 and 181 is then carried through a passageway 184 to a second set of interengaging compression and metering rotor wheels 185 and 186, which are also rigidly mounted on the parallel shafts 175 and 176, respectively. As seen in FIGS. 22, 26 and 28, the air passageway 184 is positioned in the exhaust maniford 172, whereby the compressed air exiting from rotors 180 and 181 is heated and further compressed by expansion as it passes through passageway 184 to the compression and metering rotor wheels 185 and 186.

The compression and metering rotor wheels 185 and 186 further compress the air supplied thereto through passageway 184 and positively deliver the compressed air into another passageway 188 which is also disposed within the exhaust manifold 172. Passageway 188 provides a path for the air to travel upwardly along the left or forward end of the engine and rearwardly along the top of the engine, as seen in FIG. 22, to a point where fuel is injected into the passageway and intimately mixed with the compressed air via a fuel injection means 190, whereafter the fuel-air mixture is ignited by an ignition means 189. The passageway 188 is sharply curved in this area to increase the turbulence of air flow and the consequent distribution of fuel within the air.

After the fuel-ignition device 180, the passageway 184 becomes a combustion chamber 192 comprising an elongated passageway which is also encased within the exhaust manifold 172. The combustion chamber 192 extends forwardly along the top of the engine, downwardly along the front of the engine, and rearwardly across the bottom of the engine. This provides a substantial volume in which the combustion can occur and proceed to completion. The combustion chamber 192 is maintained at a high temperature by virtue of being surrounded by the exhaust manifold, and this encourages complete combustion of the fuel-air mixture.

The hot expanded and expanding combustion gases are delivered by the combustion chamber 192 to a set of interengaging output rotor wheels 195 and 196 rigidly mounted on shafts 175 and 176, respectively. As best seen in FIG. 24, a baffle 197 directs the gases appropriately for driving the output rotors. The rotary motion of the output rotor wheels is imparted to the shafts 175 and 176 to drive the aforementioned rotors 180, 181, 185 and 186, and the usable power of the engine may be removed from shafts 175 and 176 at any appropriate point means of an output gear (not shown).

After the combustion gases have done their work on output rotor wheels 195 and 196, they enter the exhaust manifold 172 which extends along the top of the engine, down the front of the engine and along the bottom of the engine through an exhaust port 199. As previously described, the exhaust manifold 172 surrounds the compressed air passage 184, the compressed air passage 188, and the combustion chamber 192, wherein these passages are maintained at a high temperature contributing to the high thermal efficiency of the engine 170.

Shown generally at 198 of FIGS. 22 and 23 is a start-up system comprising a start-up motor and associated gearing, all similar to that previously described with respect to the engine 100 shown in FIG. 1, for initiating operation of the engine.

In this as in previous embodiments of the invention, the compression and metering of rotor wheels 185 and 186 have an axial width less than that of the output rotor wheels 195 and 196 and the air intake and compression rotor wheels 180 and 181. This insures that the combustion gases will do a greater amount of work on the output rotor wheels 195 and 196 so that the engine resists stalling and always turns in the desired direction, and yet permits the use of large air intake and compression rotor wheels 180 and 181 wherein a high volume of air is taken into the engine and highly compressed so that the engine will be efficient and powerful.

It is to be understood that variations may be made from that disclosed in accordance with the teaching of the present invention. Merely for example, an exhaust manifold which surrounds the compressed air passageways and combustion chamber can be used with embodiments other than engine 170, and the selective gear means for varying the speed of the compression and metering rotor wheels may also be incorporated into any of the several embodiments.

While I have disclosed several embodiments of the present invention, it is to be understood that these embodiments are for illustration only and not used in a limiting sense.

What I claim is:

1. An internal combustion engine comprising:
   A. A housing having an air inlet opening formed therein;
   B. A first set of rotatably mounted interengaging air intake and compression rotor wheels disposed within a chamber in said housing and in communication with the air inlet;
   C. A second set of rotatably mounted interengaging compression and metering rotor wheels disposed in another chamber within said housing;
   D. A passage defined by said housing and connecting said first set of air intake and compression rotor wheels to said second set of compression and metering rotor wheels;
   E. A combustion chamber defined by said housing;
   F. A passage defined by said housing and connecting said combustion chamber with said second set of compression and metering rotor wheels, whereby said second set of compression and metering rotor wheels delivers compressed air to said combustion chamber;
   G. Means for supplying fuel to said combustion chamber and for initiating combustion of said fuel therein;
   H. A third set of rotatably mounted interengaging output rotor wheels disposed in a chamber in said housing in communication with said combustion chamber, wherein combustion gases from said combustion chamber pass through and drive said output rotor wheels, said output rotor wheels having a substantially larger working area than the working area of the second set of compression and metering rotors so that the combustion gases drive the output rotor wheels rather than drive the compression and metering rotor wheels;
   I. Means connecting said output rotor wheels with said first set of air intake and compression rotor wheels and said second set of compression and metering rotor wheels whereby said first set of air intake and compression wheels and said second set of compression and metering rotor wheels are driven by said output rotor wheels; and
   J. An outlet opening defined in said housing and communicating with said output rotor wheels for exhausting the combustion gases,
   wherein said first set of air intake and compression rotor wheels have a substantially larger working area than either said second set of compression and metering rotor wheels or said output rotor wheels, whereby a large volume of air is intaken into the internal combustion engine, compressed, and delivered to the combustion chamber.

2. An internal combustion engine as defined in claim 1 and further comprising:
   K. Two parallel shafts rotatably mounted within said housing, one of each set of interengaging rotor wheels mounted on one of said parallel shafts and the other of each set of interengaging rotor wheels mounted on the other of said parallel shafts.

3. An internal combustion engine as defined in claim 1 and further comprising:
   K. An elongated exhaust manifold connected to said outlet opening, the elongated exhaust manifold at least partially disposed in the path of air entering the air inlet opening defined by said housing, whereby the exhausting combustion gases heat the exhaust manifold and the exhaust manifold preheats incoming air passing thereover.

4. An internal combustion engine as defined in claim 3 wherein said air inlet opening is flanked by a pair of substantially parallel facing plates, and wherein said exhaust manifold is disposed between said substantially parallel facing plates.

5. An internal combustion engine as defined in claim 1 further comprising:
   K. Means for initially driving said air intake and compression rotor wheels and said compression and metering rotor wheels prior to the inception of combustion.

6. An internal combustion engine as defined in claim 2 wherein said two parallel shafts are hollow and further comprising:
   L. A pair of cooling wheels, one of said cooling wheels mounted on one of said hollow parallel shafts and the other cooling wheel mounted on the other of said hollow parallel shafts, said cooling wheels each having curved fan blades arrayed thereabout and including openings communicating with the hollow portions of said parallel shafts, wherein the fan blades deliver air through the openings to the hollow portions of said hollow parallel shafts for cooling said shafts.

7. An internal combustion engine as defined in claim 1 and further comprising:
   K. Means for providing a spray of water into said combustion chamber.

8. An internal combustion engine as defined in claim 1 and further comprising:
   K. An additional set of rotatably mounted interengaging compression and metering rotor wheels disposed within a chamber defined by said housing;
   L. A jet combustion chamber defined by said housing and in communication with said additional set of compression and metering rotor wheels whereby compressed air is delivered to said jet combustion chamber; and
   M. Means for supplying fuel to said jet combustion chamber and for igniting said fuel.

9. An internal combustion engine as defined in claim 1 wherein said means for driving said first set of air intake and compression rotor wheels and said second set of compression and metering rotor wheels from said set of output rotor wheels comprises gear means for driving said second set of compression and metering rotor wheels at a first speed and gear means for driving said second set of compression and metering rotor wheels at a second speed, and further comprising:
   K. Means for selectively engaging one of said gears for driving the second set of compression and metering rotors at the desired one of said first or second speeds.

10. An internal combustion engine as defined in claim 1 and further comprising:
    K. An elongated exhaust manifold connected to said outlet opening, said elongated exhaust manifold having disposed therein the passageway connecting said first set of air intake and compression rotor wheels with said second set of compression and metering rotor wheels.

11. An internal combustion engine as defined in claim 1 and further comprising:
    K. An elongated exhaust manifold connected to said outlet opening, said elongated exhaust manifold having disposed therein the passageway which provides air communication between said second set of compression and metering rotor wheels and said combustion chamber.

12. An internal combustion engine as defined in claim 1 and further comprising:

K. An elongated exhaust manifold connected to said outlet opening, said elongated exhaust manifold having the combustion chamber disposed therein.

13. An internal combustion engine as defined in claim 1 and further comprising:

K. An elongated exhaust manifold connected to said outlet opening, said elongated exhaust manifold disposed therein:
  1. The passageway connecting said first set of air intake and compression rotor wheels with the said second set of compression and metering rotor wheels;
  2. The passageway connecting the second set of compression and metering rotor wheels with said combustion chamber; and
  3. Said combustion chamber; said elongated exhaust manifold being further disposed in the path of air entering the air inlet opening into said internal combustion engine to preheat said air.

* * * * *